United States Patent
Zhang et al.

(10) Patent No.: US 9,081,603 B2
(45) Date of Patent: Jul. 14, 2015

(54) PACKET FORWARDING OPTIMIZATION WITH VIRTUAL MACHINE MOBILITY BY COMPARING DEVICE IDENTIFIERS TO DETERMINE VM MOVEMENT

(75) Inventors: Ming Zhang, San Jose, CA (US); Chengelpet V. Ramesh, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 291 days.

(21) Appl. No.: 13/544,392

(22) Filed: Jul. 9, 2012

(65) Prior Publication Data

US 2014/0013324 A1    Jan. 9, 2014

(51) Int. Cl.
 G06F 9/455   (2006.01)
 H04L 12/931  (2013.01)

(52) U.S. Cl.
 CPC ............ G06F 9/45558 (2013.01); H04L 49/70 (2013.01); *G06F 2009/4557* (2013.01); *G06F 2009/45595* (2013.01)

(58) Field of Classification Search
 None
 See application file for complete search history.

(56) References Cited

U.S. PATENT DOCUMENTS

| | | | |
|---|---|---|---|
| 8,054,832 B1* | 11/2011 | Shukla et al. | 370/389 |
| 8,190,769 B1* | 5/2012 | Shukla et al. | 709/238 |
| 2009/0182928 A1* | 7/2009 | Becker et al. | 711/6 |
| 2009/0282090 A1* | 11/2009 | Hamilton et al. | 707/204 |
| 2009/0296726 A1 | 12/2009 | Snively et al. | |
| 2010/0165877 A1 | 7/2010 | Shukla et al. | |
| 2010/0169467 A1 | 7/2010 | Shukla et al. | |
| 2010/0275199 A1* | 10/2010 | Smith et al. | 718/1 |
| 2013/0215888 A1* | 8/2013 | Zhang et al. | 370/390 |

OTHER PUBLICATIONS

IETF RFC 6325, R. Perlman et al., "Routing Bridges (RBridges): Base Protocol Specification", Jul. 2011.
IETF RFC 5556, J. Touch et al., "Transparent Interconnection of Lots of Links (TRILL)", May 2009.

* cited by examiner

*Primary Examiner* — Meng An
*Assistant Examiner* — Michael Ayers
(74) *Attorney, Agent, or Firm* — Cindy Kaplan (57) ABSTRACT

In one embodiment, a method includes tracking at a network device in communication with a plurality of virtual machines, virtual machine movement based on a device identifier in a packet received from one of the virtual machines and storing location information for the virtual machine in a virtual machine move list at the network device. The location information from the virtual machine move list is inserted into a forwarding information base for use in optimized forwarding of packets destined for the virtual machine. An apparatus and logic are also disclosed herein.

14 Claims, 6 Drawing Sheets

PACKET FORWARDING OPTIMIZATION
WITH VIRTUAL MACHINE MOBILITY BY
COMPARING DEVICE IDENTIFIERS TO
DETERMINE VM MOVEMENT

TECHNICAL FIELD

The present disclosure relates generally to communication networks, and more particularly, to packet forwarding with virtual machine mobility.

BACKGROUND

Virtualization is a technology that allows one computer to do the job of multiple computers by sharing resources of a single computer across multiple systems. Through the use of virtualization, multiple operating systems and applications can run on the same computer at the same time, thereby increasing utilization and flexibility of hardware. Virtualization allows servers to be decoupled from underlying hardware, thus resulting in multiple virtual machines sharing the same physical server hardware. The virtual machines may move between servers based on traffic patterns, hardware resources, or other criteria. The speed and capacity of today's servers allow for a large number of virtual machines on each server, and in large data centers there may also be a large number of servers.

As switching systems evolve for large data centers, multiple switch solutions have become dominate for use in switching traffic in the data center. In conventional systems, when virtual machines move between servers, traffic may not be optimally forwarded by the switches. This suboptimal forwarding results in delay and increases to switching bandwidth consumption due to the extra hops required to forward the packets.

BRIEF DESCRIPTION OF THE DRAWINGS

Corresponding reference characters indicate corresponding parts throughout the several views of the drawings.

DESCRIPTION OF EXAMPLE EMBODIMENTS

Overview

In one embodiment, a method generally comprises tracking at a network device in communication with a plurality of virtual machines, virtual machine movement based on a device identifier in a packet received from one of the virtual machines and storing location information for the virtual machine in a virtual machine move list at the network device. The location information from the virtual machine move list is inserted into a forwarding information base for use in optimized forwarding of packets destined for the virtual machine.

In another embodiment, an apparatus generally comprises a processor for tracking virtual machine movement based on a device identifier in a packet received from a virtual machine and storing location information for the virtual machine in a virtual machine move list. The apparatus further comprises memory for storing the virtual machine move list. The location information from the virtual machine move list is inserted into a forwarding information base for use in optimized forwarding of packets destined for the virtual machine.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

The embodiments described herein provide optimized packet forwarding with virtual machine mobility. The embodiments overcome drawbacks with conventional switching systems for large data centers and support virtual machine mobility for both IPv4 and IPv6 networks.

As described in detail below, the embodiments are used to track virtual machine movement and insert location (virtual machine movement) information into a forwarding information base (FIB) to provide optimal forwarding with virtual machine mobility. One embodiment is implemented in a two-tier network in which the FIB at one or more aggregation switches is updated with the virtual machine movement information. Another embodiment is implemented in a flat architecture in which the FIBs at a plurality of access switches are updated with the virtual machine movement information.

Figure 1:
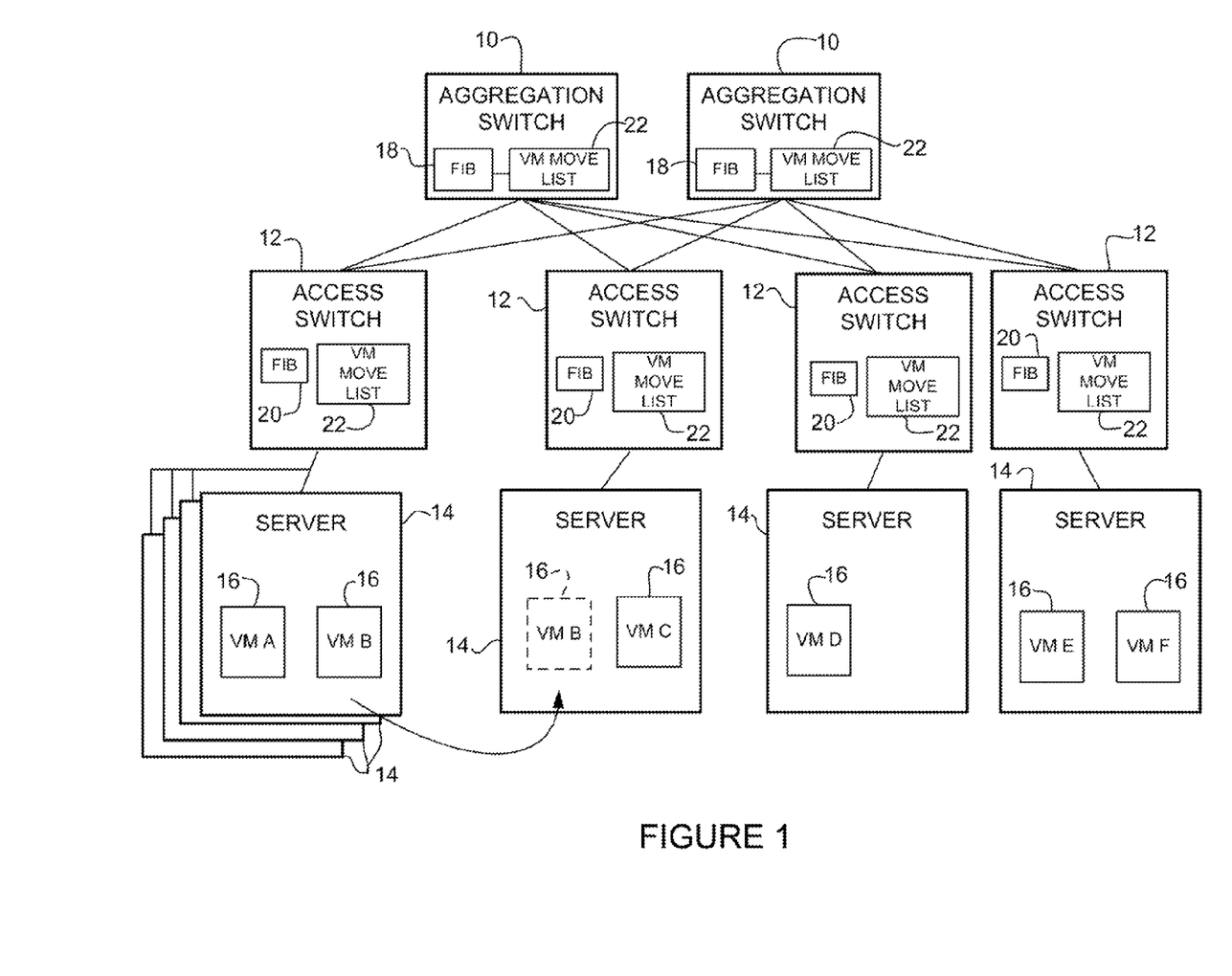
FIG. 1 illustrates an example of a network in which embodiments described herein may be implemented.

Referring now to the drawings, and first to FIG. 1, an example of a network in which a first embodiment may be implemented is shown. The network may be configured for use as a data center or any other type of network. For simplification, only a small number of nodes are shown. FIG. 1 illustrates a two-tier network architecture comprising one or more network devices 10 at an aggregation layer in communication with a plurality of network devices 12 at an access layer. The aggregation switches 10 may be in communication with a core layer (not shown) or other network. The network shown in the example of FIG. 1 includes two aggregation switches 10 in communication with four access switches 12. The access switches 12 are in communication with a plurality of network devices (e.g., servers, hosts, physical machines) 14, comprising virtual machines 16. Each access switch 12 may be in communication with one or more servers 14 and each server may comprise any number of virtual machines 16. Each server 14 may also be in communication with multiple access switches 12 to provide redundancy for improved network reliability. The network may also comprise any number of virtual local area networks (VLANs).

The network devices 10, 12 may be layer 2 (L2)/layer 3 (L3) switching devices or other network devices configured to perform forwarding functions. The network devices 10, 12 may include one or more FIBS 18, 20 or other tables used in performing switching or forwarding functions. In one example, the access switches 12 are Top-of-Rack (ToR) switches. The network devices 10, 12 may be, for example, a NEXUS 5000 or NEXUS 7000 series switch available from Cisco Systems, Inc. of San Jose, Calif. In one example, the network devices 12 are access layer switches (e.g., NEXUS 5000) and are in communication with one or more aggregation layerswitches 10 (e.g., NEXUS 7000). As noted below, these are only examples of network devices that may be used to implement the embodiments described herein.

The server 14 may be, for example, a blade server, rack server, or any other type of network device operable to host virtual machines 16. The servers 14 may, for example, host application servers or remotely hosted virtual machine applications for use at end user equipment (end stations, client devices) (not shown). The server 14 may include a virtual switch (e.g., Virtual Ethernet Module (VEM) of a NEXUS 1000 series switch, available from Cisco Systems, Inc.). In the example shown in FIG. 1, the servers 14 comprise a plurality of virtual machines (VM A, VM B, VM C, VM D, VM E, VM F) 16.

The virtual machines 16 share hardware resources without interfering with each other, thus enabling multiple operating systems and applications to execute at the same time on a single computer. The virtual machines 16 may be used, for example, in a virtual infrastructure to dynamically map physical resources to business needs. A virtual machine monitor such as hypervisor (not shown) dynamically allocates hardware resources to the virtual machines 16. The virtual machines 16 may be moved (referred to, for example, as virtual machine mobility, vMotion, live migration, or virtual machine migration) between servers 14, across layer 2 or layer 3 boundaries, based on traffic patterns, hardware resources, or other criteria. Virtual machine mobility may also be used to support data center maintenance, consolidation, or expansion, and provide workload balancing across multiple sites. In FIG. 1, VM B is shown moving from one server 14 to another.

Each aggregation switch 10 and access switch 12 includes a layer 3 forwarding information base (FIB) 18, 20 and virtual machine (VM) move list 22. The VM move list 22 is created and managed at each access switch 12 and entries are propagated to the aggregation switches 10 in the centralized model shown in FIG. 1. The VM move list information may be transmitted using a management protocol or routing protocol (e.g., BGP (Border Gateway Protocol)). The VM move list 22 contains an entry for each virtual machine 16 that has moved away from its home (initial, original) switch 12. The term home switch as used herein refers to the switch 12 from where the virtual machine 16 was initialized. The VM move list 22 may include, for example, a VM address (e.g., IPv4 host address and/or an IPv6 host address) and a device ID identifying the access switch 12 that the virtual machine is associated with after a move. An example of a virtual machine move list 22 is described below with respect to FIG. 5.

The virtual machine move list 22 is used to track virtual machine movement and update the forwarding information base to provide optimized packet forwarding with virtual machine mobility. In the first embodiment shown in FIG. 1, location (forwarding, virtual machine movement) information from the VM move list 22 is inserted (installed, programmed) in the FIBs 18 at the aggregation switches 10. The VM moves are programmed in the FIB table 18 on the aggregation switch 10 with next hop points to their corresponding egress access switches 12. For moved virtual machine entries installed in the FIB 18, packets can be forwarded directly to the final (egress) access switch 12 without going through an intermediate switch (home switch of VM before move), as done in conventional systems.

In one embodiment, a device prefix aggregation scheme is utilized to support a large number of virtual machines 16 with small forwarding information base (FIB) tables 20 at the access switches 12. A device prefix is formed from a subnet prefix (associated with virtual local area network (VLAN)) and a device identifier (ID) assigned to the switch 12. The device prefix may be provisioned on the access switch 12, one for each VLAN on the switch, for example. Examples of a device prefix aggregation scheme are described further below with respect to an address format shown in FIG. 6. The device prefix aggregation scheme may be used, for example, with IPv4 (Internet Protocol version 4) or IPv6 (Internet Protocol version 6). It is to be understood that the device prefix described herein is only an example and that other prefixes or identifiers may be used without departing from the scope of the embodiments. The term device prefix as used herein refers to an identifier used to uniquely identify the switch 12 and VLAN, and installed on one or more of the FIBs 18, 20 for use in forwarding packets.

In one embodiment, the device identifier (ID) is used as a location indicator for use in determining whether the virtual machine 16 is located at a server 14 connected to its home switch 12, or has been moved to a server connected to a foreign switch. In order to keep existing application sessions alive when the virtual machine 16 moves, the virtual machine preferably uses the same IP (Internet Protocol) and MAC (Media Access Control) addresses after the move, stays on the same VLAN, and sends a protocol packet to notify all nodes on the VLAN that the virtual machine has moved. For example, an IPv4 virtual machine 16 may send a gratuitous ARP (Address Resolution Protocol) packet to a broadcast address on the VLAN to notify the nodes on the VLAN that the virtual machine has moved. In another example, an IPv6 virtual machine 16 may send a neighbor discovery neighbor advertisement (ND-NA) packet to a multicast IP address (e.g., destination address (DA)=FF02::1) on the VLAN. If the virtual machine 16 is moved across a switch 12 boundary, the virtual machine movement is detected on the new switch by comparing the location indicator (device ID) in the source address of the ARP or ND-NA packet with the device ID of the new switch.

The neighbor discovery NA packet sent after virtual machine movement may also trigger a MAC relearning in a layer 2 network within the switching system. After the relearning, the MAC entry in the MAC table on the original switch 12 is updated to point to the new switch. This process establishes a two hop hardware forwarding path for packets to reach the moved virtual machine; one hop from a source switch 12 to the original (home) switch and the second hop from the original switch to the new destination switch. However, as described above, this extra hop in the forwarding path introduces delay and additional switching bandwidth consumption. The embodiments described herein utilize the VM move list 22 to track virtual machine movement and update the FIB to optimize packet forwarding and eliminate or reduce the use of this two hop forwarding path, by forwarding packets directly to the new switch 12 connected to the server 14 where the virtual machine has moved, without passing through the original switch associated with the virtual machine. Packets destined to the moved virtual machine 16 are optimally forwarded (with one hop at the access layer) from the source switch 12 to the new destination switch once the VM move list entry is installed in the FIB.

In one embodiment, the aggregation switches 12 each have a large L3 FIB table 18 implemented in hardware (e.g., ASIC (Application Specific Integrated Circuit)). The table 18 is preferably large enough to include all of the virtual machine moves. Since the number of aggregation switches 12 at a large data center is typically significantly smaller than the number of access switches 12, the cost to support a large FIB table 18 on the aggregation switch is much less than supporting large FIB tables on all of the access switches 12.

The following describes two examples of L3 FIB table implementations. In the description herein, reference to the L3 FIB table, may refer to either implementation. In a first example, the FIB table 18 includes all host routes and IGP (Interior Gateway Protocol)/BGP (Border Gateway Protocol) routes.

In a second example, the FIB table 18 comprises a host (next hop) table and a Longest Match Route (LMR) table. The host table stores all directly connected host entries and the LMR table stores routes learned through routing protocols. It is to be understood that these are only examples, and other L3 FIB table implementations may be used.

In one embodiment, the L3 FIB table entries are inserted by FIB and next hop managers in software. The FIB table 18 may comprise, for example, CAM (Content Addressable Memory), or any other data structure.

The following describes examples of hardware programming on the ingress switches 12, egress switches 12, and aggregation switches 10. The ingress switch 12 is the switch at which packets transmitted from a virtual machine 16 at a connected server 14 are received. The egress switch 12 is the switch at which packets destined for a virtual machine 16 at a connected server 14 are received. Thus, each access switch 12 can operate as an ingress or egress switch for different virtual machines and traffic.

Hardware programming on the ingress access switch 12 may be performed by programming device prefixes or programming a default, route. In a first example, all device prefixes are programmed on the ingress access switch 12 with next hop pointers to the aggregation switch (or switches) 10. In the case of multiple aggregation switches 10 (as shown in FIG. 1), the next hop may be an ECMP (Equal Cost Multi-Path) route. This option allows state update on the device prefixes. If an access switch 12 is out of service, the device prefixes associated with the access switch can be marked as down state.

In a second example, only a default prefix is installed in the FIB table 20 in hardware on the ingress access switch 12 with next hop pointers to the aggregation switch (or switches) 10.

At the egress switch 12, entries for all local connected virtual machines (whether moved or not moved) are programmed in the FIB table 20 in hardware.

On the aggregation switches 10, all device prefixes are programed in the FIB table 18 in hardware, with next hop pointers to their corresponding egress switches 12. The moved VM entries (from the VM Move list 22) are also programmed in the FIB table 18 in hardware on the aggregation switch 10 with next hop pointers to their corresponding egress switches 12. This allows packets to be forwarded directly to the final (egress) switch 12 without going through an intermediate switch (original switch) for moved virtual machines 16.

The following describes a packet flow example for a packet transmitted from a virtual machine 16 on a first server 14 connected to an access switch 12 (ingress access switch) and destined to a virtual machine on a second server connected to a different access switch (egress access switch) (FIG. 1). In this example, the source and destination addresses are on different subnets. The packet first arrives at the ingress access switch 12 and an L3 lookup is performed. The lookup identifies a device prefix or a default prefix (depending on which of the above described implementations are employed). The packet is then forwarded to the aggregation switch 10. An L3 lookup is performed at the aggregation switch 10 that receives the packet. The lookup identifies a device prefix for an access switch 12 or a VM entry (if the VM has moved). The packet is forwarded to the egress switch 12 based on the lookup result. An L3 lookup is then performed at the egress switch 12. The lookup identifies the destined VM entry (assuming the MAC address of the destined VM has been resolved). The packet is then forwarded to the destined virtual machine 16 at server 14. The packet thus follows a path from the ingress switch to the egress switch connected to the server 14 containing the destined virtual machine 16, without having to pass through an intermediate switch (home switch) even if the virtual machine has moved.

If the number of moved virtual machine entries extends beyond the size of the FIB table 18, traffic for the moved VM entries that cannot be inserted into the L3 FIB table will be forwarded through a suboptimal path (i.e., travel through an intermediate access switch 12). The suboptimal path can also serve as a backup path for any VM moved entries that fail to be programmed in the FIB table 18 on the aggregation switch 10. Thus, even if the optimal path cannot be identified for a subset of traffic, this traffic will still be delivered to its destination (via a suboptimal path), and no traffic loss will result.

Figure 2:
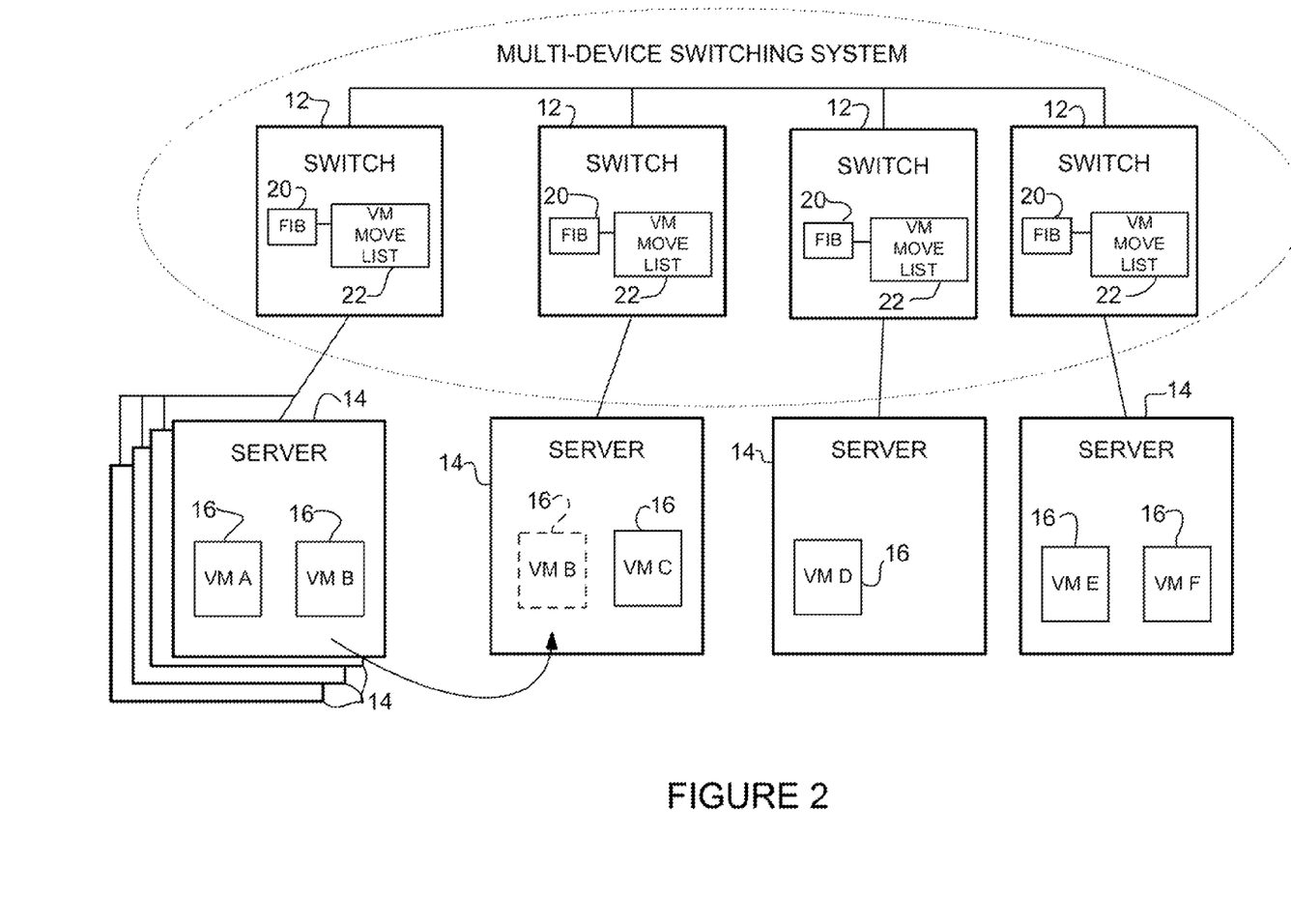
FIG. 2 illustrates another example of a network in which embodiments described herein may be implemented.

FIG. 2 illustrates another example of a network in which the embodiments described herein may be implemented. The network includes switches 12 (e.g., access switches) in communication with servers 14 comprising a plurality of virtual machines 16. In the example shown in FIG. 2, the network comprises a flat architecture in which the switches 12 are interconnected by a common fabric. The term flat architecture as used herein may also refer to access switches in communication through a layer 2 core network. The layer 2 core network may be L2 tunnels implemented with FabricPath technology (available from Cisco Systems, Inc.) or TRILL (Transparent Interconnect of Lots of Links) standard (IETF (Internet Engineering Task Force) RFC Request for Comments) 5556 ("Transparent Interconnection of Lots of Links (TRILL)", J. Touch et al., May 2009) and IETF RFC 6325 ("Routing Bridges (RBridges): Base Protocol Specification", R. Perlman et al., July 2011)). The switches 12 may form, for example, a virtual switch in which traffic travels through the multi-device switching system as if switching through a single switching device. A packet forwarded across the switches 12 may go through two stages of hardware lookup and forwarding; a first at an ingress switch and a second at an egress switch.

Each switch 12 includes a forwarding information base (FIB) 20 and virtual machine (VM) move list 22. The embodiment shown in FIG. 2 uses the fact that there may be unused space in the FIB tables 20 at the access switches 12 that can be allocated dynamically to support optimal forwarding for moved virtual machines 16.

The VM move list 22 is created and managed at each switch 12 and entries are propagated to the other switches in the distributed model shown in FIG. 2. As described above, the VM move list 22 contains an entry for each virtual machine 16 that has moved away from their home switch 12. The VM move may be identified at the switch using a location indicator as described above. As previously described, the virtual machine move list 22 is used to track virtual machine movement and update the forwarding information base to provide optimal packet forwarding with virtual machine mobility. In the second embodiment shown in FIG. 2, location information from the VM move list 22 is inserted (installed, programmed) in the FIB 20 at the switch 12. For moved virtual machine entries installed in the FIB 20, packets can be forwarded directly to the final (egress) access switch 12 without going through an intermediate switch (home switch), as done in conventional systems.

In addition to the VM address and device ID, the VM move list 22 may also include a priority for use in determining which VM moves to install in the FIB 20 if there is limited space available in the FIB table. Examples of priority levels that may be assigned are described below with respect to the VM move list 22 shown in FIG. 5.

All local connected virtual machine (moved or not moved) entries are programmed in the FIB table 20 in hardware. There is often space remaining in the FIB table 20. In order to maximize hardware utilization, some of the table space is allocated for storing moved virtual machine information (host entries). L3 traffic that hits these entries are forwarded optimally from the source (ingress) access switch 12 to the destination (egress) access switch without having to travel to an intermediate (home) access switch. This greatly reduces delay and increases available switching bandwidth that would otherwise be wasted.

The maximum FIB table 20 utilization on the switch 12 can be determined by calculating the number of switches 12, number of VLANs, and number of virtual machines 16 on servers 14 connected directly to the local access switches, in the case where the device prefix aggregation scheme is used for scaling L3 FIB table 20 in hardware. There is, therefore, no table overflow normally expected. In a case where the FIB table 20 is full, installation of moved virtual machine entries may be selected based on their priority. In order to reduce swapping, a threshold may be defined (e.g., 95%). Moved VM entry insertion is preferably stopped once the threshold is reached. For VM entries that cannot be inserted into the FIB table 20 at the access switch 12, traffic is still forwarded, although through a suboptimal path that passes through an additional hop.

It is to be understood that the networks shown in FIGS. 1 and 2, and described herein are only examples and that the embodiments described herein may be implemented in networks having different network topologies and network devices, without departing from the scope of the embodiments. For example, the network in FIG. 1 may include only one aggregation switch 10, or any number of redundant aggregation switches. The networks may include any number or configuration of virtual machines 16, servers 14, access switches 12, or aggregation switches 10.

Figure 3:
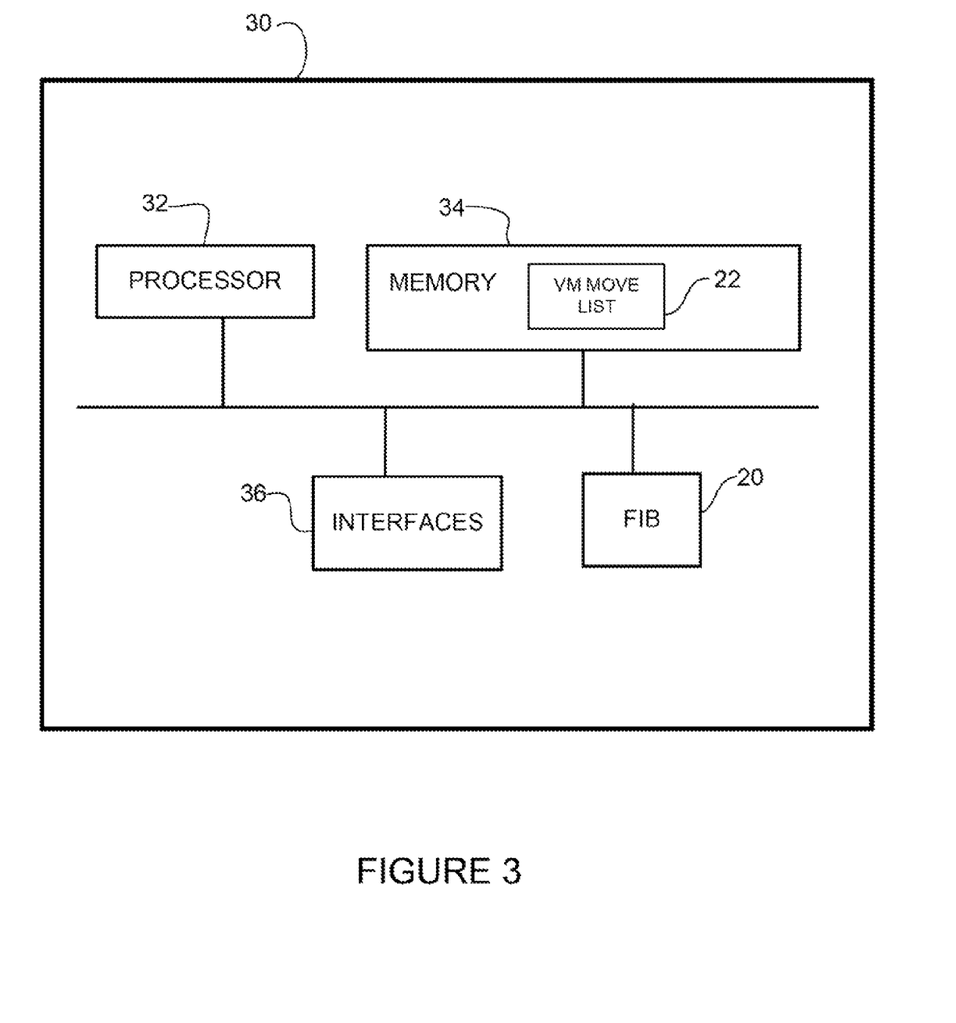
FIG. 3 depicts an example of a network device useful in implementing embodiments described herein.

An example of a network device (e.g., access switch, ToR switch) 30 that may be used to implement embodiments described herein is shown in FIG. 3. In one embodiment, network device 30 is a programmable machine that may be implemented in hardware, software, or any combination thereof. The device 30 includes one or more processor 32, memory 34, network interface 36, and FIB table 20. Memory 34 may be a volatile memory or non-volatile storage, which stores various applications, modules, and data for execution and use by the processor 32. For example, memory 34 may include VM move list 22, or other data structures or code. In one embodiment, the virtual machine move list 22 is generated in software and used to program the FIB 20 in hardware.

Logic may be encoded in one or more tangible computer readable media for execution by the processor 32. For example, the processor 32 may execute codes stored in a computer readable medium such as memory 34. The computer readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium.

The network interfaces 36 may comprise any number of interfaces (linecards, ports) for receiving data or transmitting data to other devices. The interface 36 may include, for example, an Ethernet interface for connection to a computer or network.

It is to be Understood that the network device shown in FIG. 3 and described above is only an example and that network devices having different components and configurations may be used without departing from the scope of the embodiments.

Figure 4:
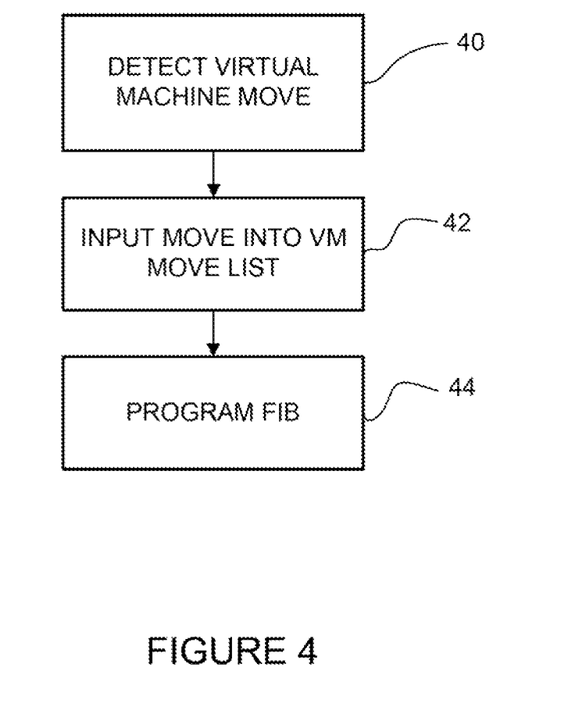
FIG. 4 is a flowchart illustrating an overview of a process for packet forwarding optimization with virtual machine mobility, in accordance with one embodiment.

FIG. 4 is a flowchart illustrating an overview of a process for use in optimized packet forwarding with virtual machine mobility, in accordance with one embodiment. As shown in FIGS. 1 and 2, virtual machine B moves from a first server to a second server. In this example, the first server is the server at which virtual machine B was located when it was first initialized, and the switch 12 connected to the first server is the virtual machine's home switch and has a device (switch) identifier of SID-1. The second server is connected to a switch with device identifier of SID-2. At step 40, switch 12 detects movement of the virtual machine 16 to the second server. The virtual machine move may be detected, for example, through a neighbor discovery neighbor advertisement packet, which is sent to all nodes (multicast address). The neighbor discovery neighbor advertisement packet may also trigger a MAC address relearning process, as described above. The packet includes a device ID in the source address field, which identifies its home switch (SID-1). This device ID is compared with the device ID of the new connected switch 12. In this example, the switch 12 recognizes that the packet transmitted by the virtual machine 16 has a different switch identifier (SID-1) than its own switch identifier (SID-2), which confirms movement of the virtual machine.

The VM move is entered into the VM move list 22 at the switch 12 (step 42). The VM move list entry is propagated from the access switch 12 to the aggregation switches 10 (for the first embodiment described above with respect to FIG. 1) or to the other switches 12 (for the second embodiment described above with respect to FIG. 2). The entry (location information) from the VM move list 22 is then programmed in the FIB (step 44). In the first embodiment (FIG. 1), the VM move is programmed at the FIBs 18 located at the aggregation switches 10. In the second embodiment (FIG. 2), the VM move is programmed at the FIBS 20 located at the access switches 12. If the FIB table 18, 20 is full, priorities in the VM move list 22 may be used to determine which VM moves should be inserted into the FIB, as described further below.

It is to be understood that the process illustrated in FIG. 4 and described above is only an example and that steps may be modified, added, or combined, without departing from the scope of the embodiments.

Figure 5:
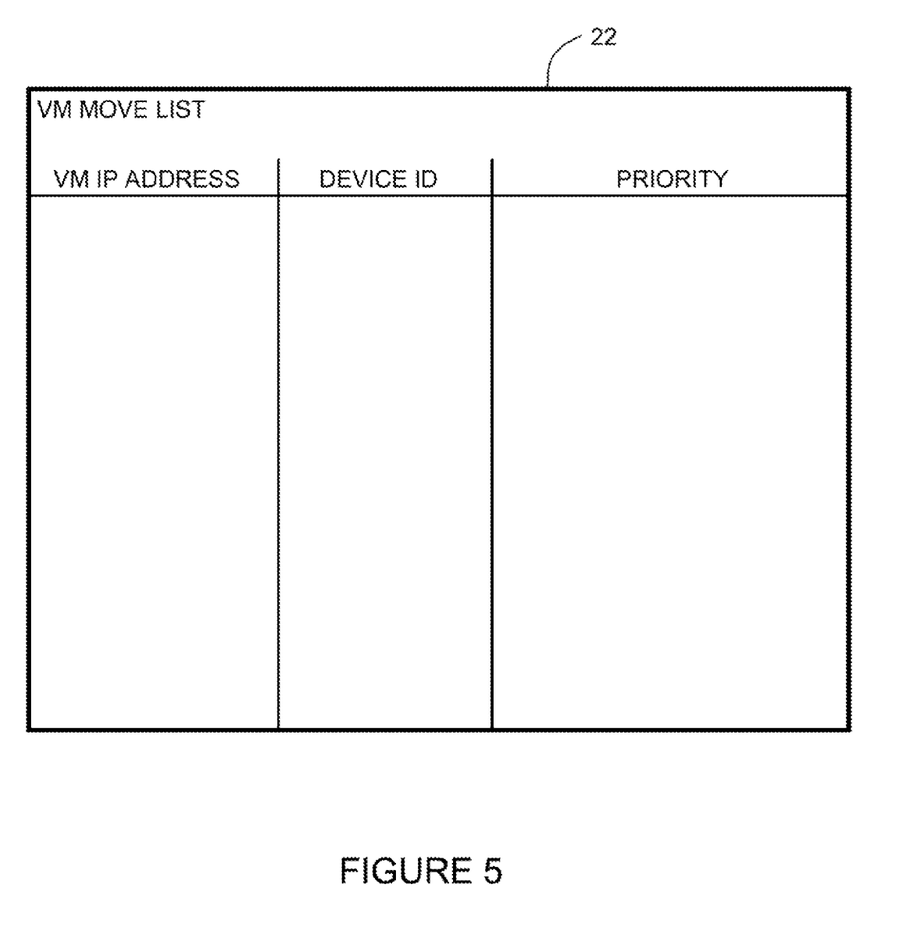
FIG. 5 is an example of a virtual machine move list for use in optimized forwarding in the network of FIGS. 1 and 2, in accordance with one embodiment.

FIG. 5 illustrates an example of virtual machine move list 22, in accordance with one embodiment. Each entry includes a VM address, device ID, and priority. The VM address may be, for example, an IPv4 host address (32 bit mask) and/or an IPv6 host address (128 bit mask). The device ID is an identifier for the access switch 12 connected to the server to which the virtual machine 16 has moved. The priority is a preference for insertion of the virtual machine move in the FIB if there is not sufficient space available to insert all VM moves. In one embodiment, the priority may be defined as (1) critical, (2) device out of service, or (3) normal. Priority (2) is used for redundancy when a switch 12 is out of service either due to hardware/software failure or shut down by an operator. When a switch is out of service, not only the virtual machines on directly connected servers are out of reach, those virtual machines that can be reached through this switch as an intermediate hop are also impacted. The embodiments described herein provide a solution for keeping those moved virtual machines reachable during the device down time. Priority may also be configured by a network operator.

It is to be understood that the table 22 shown in FIG. 5 is only one example of a data structure for use in tracking VM movement and that other data structures containing different information may also be used, without departing from the scope of the embodiments. For example, if the VM move list 22 is used to program the FIB tables 18 at the aggregation switches 10, priorities may not be used, since in most cases the FIB table is large enough to install all VM moves.

As discussed above, a device prefix aggregation scheme may be used to support a large number of virtual machines 16 in a system with small FIBs (e.g., 16k-64k FIB entries) at the access switches 12. The following describes an example of a device prefix aggregation scheme for use with IPv4 or IPv6.

Figure 6:
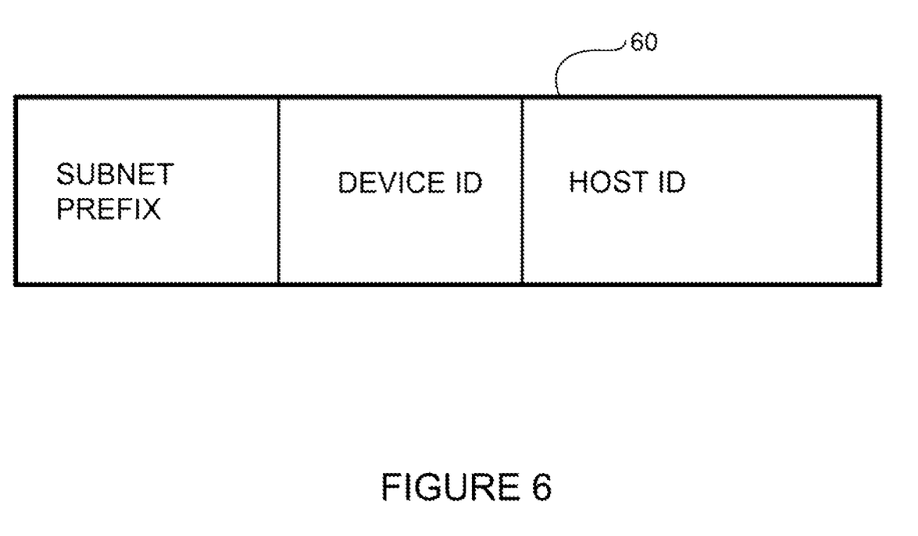
FIG. 6 illustrates an address format for use in the network of FIGS. 1 and 2, in accordance with one embodiment.

FIG. 6 illustrates an example of an address format 60 that may be used in a device prefix aggregation scheme. The highest N bits store a subnet prefix. The next M bits are allocated for a device ID. The remaining bits ((32-N-M) for IPv4, (128-N-M) for IPv6) are used to store a host ID. The number of bits (M, N) may be determined based on the number of devices, number of subnets, and number of hosts per VLAN device required in a particular data center network. Each VLAN may be assigned a subnet prefix and each switching device 12 configured with a device ID. The device prefix is formed by combining the subnet prefix and device ID.

The subnet prefix (N bits) may also be a subnet prefix assigned to a L3 interface. Each L3 interface may comprise multiple L2 switch ports and each of the L2 switch ports may share the same VLAN ID. The next M bits may be allocated for a device ID, which uniquely identifies a particular switch on the network.

A DHCP server and other management tools may be used to assign subnet prefixes, device IDs, and host IDs, for example. Host routes are summarized by the device prefix that includes the device ID of an egress access switch 12. The device prefixes are installed in the FIB tables. The device prefix may be provisioned on an egress device and subsequently installed in the hardware of one or more ingress devices. For example, a device prefix may be installed in the FIB tables on all switches 12 except for the local switch. These device prefix entries may be used for ingress lookup. For example, at an ingress switch 12, traffic is forwarded to an egress access switch based on the device prefix. As described above, the VM move list 22 is used to install device identifiers in the FIB for moved VMs to provide optimized forwarding.

In one example, the address format shown in FIG. 6 is implemented using an IPv4 addressing scheme as described in U.S. patent application Ser. No. 13/347,187, filed Jan. 10, 2012, which is incorporated herein by reference in its entirety. In another example, the address format shown in FIG. 6 is implemented using an IPv6 addressing scheme as described in U.S. patent application Ser. No. 13/247,497, filed Sep. 28, 2011, which is also incorporated herein by reference in its entirety.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising:
  receiving at a switch, a packet from a virtual machine located at a host in communication with the switch, the packet comprising a device identifier identifying another switch in communication with another host that hosted the virtual machine at the time of initialization of the virtual machine prior to movement of the virtual machine to the host;
  comparing at the switch, the device identifier in the packet received from the virtual machine with a device identifier assigned to the switch and determining that the virtual machine has moved based on the device identifier in the packet being different from the device identifier assigned to the switch;
  storing location information for the virtual machine in an entry in a virtual machine move list at the switch based on a determination that the virtual machine has moved, said entry comprising a virtual machine IP (Internet Protocol) address for the virtual machine, the device identifier assigned to the switch for identifying the switch that the virtual machine is associated with after movement, and a priority indicating a preference for inserting the location information for the virtual machine into a forwarding information base; and
  transmitting said entry for the virtual machine from the virtual machine move list to one or more other switches in communication with the switch;
  wherein said location information from the virtual machine move list is inserted into a forwarding information base at one or more of the other switches for use in optimized forwarding of packets destined for the virtual machine.

2. The method of claim 1 wherein the switches comprise access switches.

3. The method of claim 1 wherein one or more of the other switches comprise an aggregation switch.

4. The method of claim 1 further comprising determining if space is available in the forwarding information base and wherein the virtual machine location information is inserted into the forwarding information base if space is available.

5. The method of claim 1 wherein the device identifier is located in a source address field in the packet.

6. An apparatus comprising a processor for processing a packet, and memory for storing a virtual machine move list, wherein the apparatus performs the method of:
  receiving at the apparatus, a packet from a virtual machine located at a host in communication with the apparatus, the packet comprising a device identifier identifying another switch in communication with another host that hosted the virtual machine at the time of initialization of the virtual machine prior to movement of the virtual machine to the apparatus, comparing the device identifier in the packet received from the virtual machine with a device identifier assigned to the apparatus and determining that the virtual machine has moved based on the device identifier in the packet being different from the device identifier assigned to the apparatus, storing location information for the virtual machine in an entry in a virtual machine move list based on a determination that the virtual machine has moved, said entry comprising a virtual machine IP (Internet Protocol) address for the virtual machine, the device identifier assigned to the apparatus for identifying the apparatus that the virtual machine is associated with after the move, and a priority indicating a preference for inserting the location information for the virtual machine into a forwarding information base, and transmitting said entry for the virtual machine from the virtual machine move list to one or more other switches in communication with the apparatus;

wherein said location information from the virtual machine move list is inserted into a forwarding information base at one or more of the other switches for use in optimized forwarding of packets destined for the virtual machine.

7. The apparatus of claim 6 wherein the switches are access switches.

8. The apparatus of claim 6, wherein one or more of the other switches comprises an aggregation switch.

9. The apparatus of claim 6 wherein the device identifier is located in a source address field in the packet.

10. The apparatus of claim 6 wherein the apparatus is further configured to determine if space is available in the forwarding information base and wherein the virtual machine location information is inserted into the forwarding information base if space is available.

11. Computer instructions encoded on one or more non-transitory computer readable media for execution by a processor to perform the steps of:

processing a packet received at a switch from a virtual machine located at a host in communication with the switch, the packet comprising a device identifier identifying another switch in communication with another host that hosted the virtual machine at the time of initialization of the virtual machine prior to movement of the virtual machine to the host;

comparing at the switch, the device identifier in the packet received from the virtual machine with a device identifier assigned to the switch and determine that the virtual machine has moved based on the device identifier in the packet being different from the device identifier assigned to the switch;

storing location information for the virtual machine in an entry in a virtual machine move list based on a determination that the virtual machine has moved, said entry comprising a virtual machine IP (Internet Protocol) address for the virtual machine, the device identifier assigned to the switch for identifying the host and switch that the virtual machine is associated with after the move, and a priority indicating a preference for inserting the location information for the virtual machine into a forwarding information base; and transmitting entries for the virtual machine from the virtual machine move list to one or more other switches in communication with the switch;

wherein said location information from the virtual machine move list is inserted into a forwarding information base at one or more of the other switches for use in optimized forwarding of packets destined for the virtual machine.

12. The computer instructions of claim 11 wherein the switches comprise access switches.

13. The computer instructions of claim 11 wherein one or more of the other switches comprise an aggregation switch.

14. The computer instructions of claim 11 further comprising determining if space is available in the forwarding information base and wherein the virtual machine location information is inserted into the forwarding information base if space is available.

* * * * *